United States Patent Office 3,075,077
Patented Jan. 22, 1963

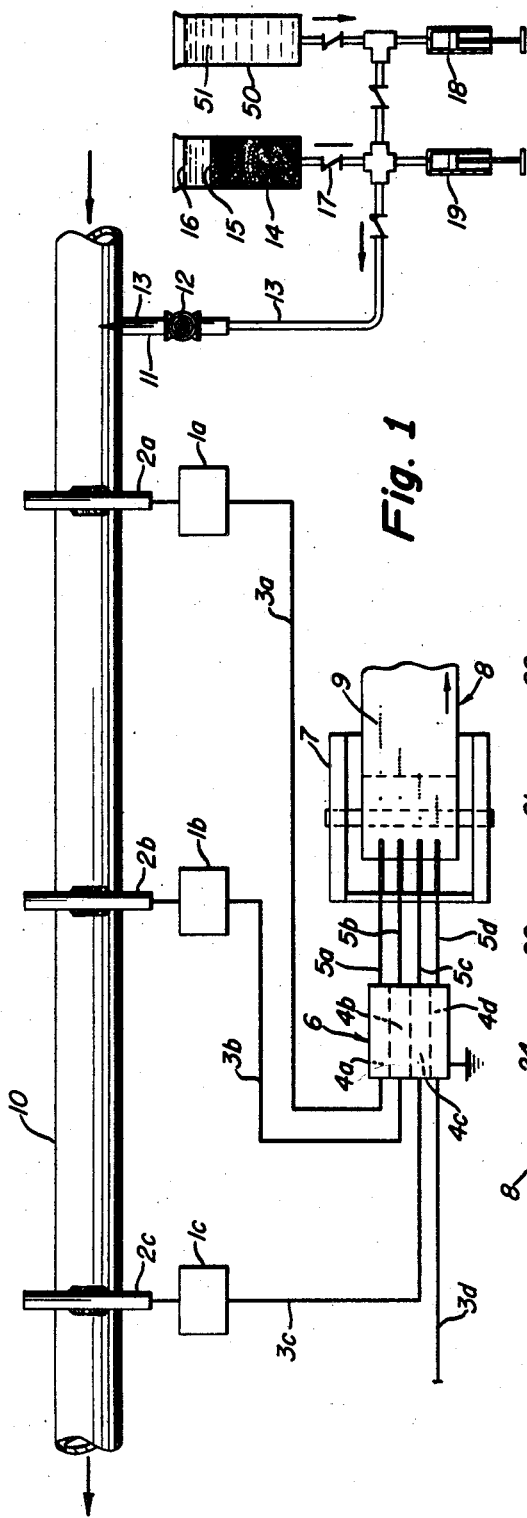

3,075,077
RADIATION FLOWMETER
William P. Staker, West Hartford, Conn., and Robert B. Jacobs, Homewood, and Irwin Ginsburgh, Chicago, Ill., assignors to Standard Oil Company, Chicago, Ill., a corporation of Indiana
Filed Mar. 18, 1959, Ser. No. 800,217
6 Claims. (Cl. 250—43.5)

This invention relates to methods and apparatus for measuring the flow of fluids using radioactive tracers, and more particularly relates to an improved system for determining flowrates, which system is characterized by freedom from hazards of radiation, and simplicity and ruggedness of equipment.

In many chemical and petroleum processing units, it occasionally becomes desirable to calibrate existing flowmeters or to determine the flowrate of fluid streams flowing through conduits which have not previously been provided with conventional orifice or similar type flowmeters. For these purposes, the art of radiation flowmetering has been developed. This art or technique generally involves the introduction of a radioactive material or "radioisotope" into the fluid stream, detecting the resultant radioactivity with suitable radiation detectors, and by means of appropriate calculations determining the flowrate in velocity or quantity units. Unfortunately, most of the techniques heretofore available for accurate work require either that large amounts of radioisotope be employed or else that the radioisotope be of long half-life. The former requirement is imposed so as to minimize errors resulting from background radiation, while radioisotopes of long half-life have usually been necessary to provide reasonable shelf life and handling life.

The introduction of large quantities of radioisotopes, or even of small quantities of long half-life radioisotopes such as antimony 124 (half-life of 60 days) can lead to serious health problems. Since the amount of radioisotope is ordinarily minute in comparison with the total fluid volume, it is rarely possible to remove the isotope from the product, and as a result the stream may be dangerously radioactive, and must be stored in segregated areas for long periods of time before safe transmission or disposal. Obvously, this represents a substantial inconvenience, to say nothing of the serious health hazard.

Accordingly, it is the primary object of this invention to provide a radiotracer flowmetering system which permits flow measurements to be made using very small quantities of radioisotopes, and which can employ radioisotopes having half lives on the order of minutes. Another object is to provide a radiotracer flowmetering technique which is characterized by exceptional freedom from health hazards, both during flowmetering operation and in subsequent handling of the metered stream. An additional object is to provide a radiation flowmetering system which affords a permanent and incontestable record of the measurement. A further object is to provide a system using simple and rugged industrial-type apparatus. Other objects and advantages will become apparent as the description of the inventive system proceeds in greater detail hereinafter.

In accordance with the objects above, the inventive operation is commenced by introducing a small amount of radioisotope, preferably one having a relatively short half-life, into a conduit confining the fluid stream whose flowrate is to be measured. As the radioisotope is carried along with the stream, the radioactivity which is emitted is detected successively by a plurality—two or more—of radiation detectors spaced at known distances along the conduit. The individual pulses of radioactivity thus detected are recorded as discrete markings on a permanent record, such as a moving strip chart composed of electric marking paper which discolors locally whenever an electric spark is discharged through it. By making a permanent record of the data as it is obtained from the detectors, the successive pulses recorded by each detector can be analyzed to determine, in addition to the flowrate, whether the stream is in viscous or in turbulent flow, whether there are flow separations or interruptions, and the degree of turbulence in the stream. And by employing a permanent record of individual pulses of radioactivity, rather than integrated or rate-meter-type readings, the separation of background radiation from radiation caused by the radioisotope tracer can be performed readily. By recording the output of each detector on a separate channel or track, it is thus possible to employ closely spaced detectors without incurring overlapping of bursts.

The invention will be described in detail in connection with the attached figures, wherein FIGURE 1 is a schematic representation of the inventive radiation flowmeter, including means for introducing a "slug" of short half-lived radioisotope into the fluid stream.

FIGURE 2 is a typical record showing a satisfactory flow measuring operation of a stream in turbulent flow.

FIGURE 3 is a record illustrating a typical measurement wherein the stream is in viscous, as distinguished from turbulent, flow.

FIGURE 4 is a record showing the radioactive isotope having been separated into two sections by a stream interruption or by a combination of wall holdup and turbulent flow.

Turning first to FIGURE 1 showing a schematic drawing of the inventive system, it is seen that a plurality of radiation detectors, 1a, 1b, 1c, etc., are positioned near conduit 10. Conduit 10, which may be an enclosed pipe or open trough, confines the fluid whose flowrate or velocity is being measured. In the example herein illustrated, conduit 10 is a pipe line carrying a liquid such as a hydrocarbon oil. Detectors 1a, etc., include a radiation-sensitive element 2a, 2b, 2c, etc., which is responsive to the particles or photons of radiation which it receives. When element 2a is positioned outside of conduit 10, substantially only gamma radiation is sufficiently penetrating to be observed from outside the conduit, and accordingly radiation-sensitive elements 2a, etc., are suitably of the Geiger counter or of the scintillometer or scintillation counter type. The latter types are most useful on streams with a very high velocity—in the hundreds of feet per second and with relatively weak injections of radioactivity. Detectors 1a, etc., may contain preamplification stages for amplifying or intensifying the signal engendered by the recepit of radiation by elements 2a, etc. The preferred type of detector is operated from local battery or 110-volt power, and transmits its signal as a low-voltage impulse; the elimination of high voltage power and signal lines affords a material safety factor in industrial locations.

In order to further reduce background radiation caused by cosmic rays, radiation sensitive elements 2a, etc., may be shielded and collimated by a dense material such as lead blocks or concrete slabs.

Each of the detectors 1a transmits its low voltage impulse via lines 3a, etc., to a recorder for recording the individual pulses of radioactivity detected by each of detectors 1a, etc., as discrete markings on a permanent record 8. This recorder suitably comprises a high speed multi-channel amplifier 6, having stages 4a, 4b, 4c, and 4d corresponding to the respective radiation detectors 1a, etc.; electrodes 5a through 5d; strip chart or record 8; and strip chart drive device 7. By this arrangement of an independent amplifier 4a etc., for each radiation detector 1a etc., it is possible to obtain separate traces on adjacent tracks corresponding to each particle or photon of radiation detected by an identifiable detector. Strip chart drive device 7 propels strip chart or record 8 at a known constant speed.

In the right hand portion of FIGURE 1 there is shown a suitable system for introducing a small slug of a radioisotope, desirably a short half-lived radioisotope, into the liquid stream flowing through conduit 10. This system includes nipple 11 communicating with conduit 10, gate valve 12 in nipple 11, and capillary tube 13 which extends into conduit 10 through open gate valve 12 and desirably terminates near the center of the conduit. Capillary tube 13 connects into a common joint with "milker" 14 and a pair of hypodermic syringe type pistons 18 and 19.

Milker 14 contains a radioisotope of long half-life which decays to a gamma-emitting daughter of relatively short half-life suitable for safe use herein. An especially suitable parent radioisotope is cesium 137, with a half-life of about 30 years, which decays to barium 137 having a half-life of 2.6 minutes and emitting a 0.662 mev. gamma photon. The daughter is "milked" from the ion exchange resin 15 containing cesium 137 by passing a weakly basic aqueous solution 16 through the exchange resin 15. A flushing solution 51 is mixed with the milked solution and both are injected into the flowing fluid. When the fluid flowing through conduit 10 is a hydrocarbon oil, it is desirable to employ a flushing solution which will make the milker solution compatible with hydrocarbon; a suitable solution has been found to consist of 50 volume percent isopropyl alcohol, 35% oleic acid, and 15% triethanol amine. For measurements with aqueous solutions or with hydrocarbons whose temperature is above about 210° F., ordinary water may be employed for flushing.

To employ the radioisotope introduction system of FIGURE 1, valve 17 in the line leading from milker 14 to capillary tube 13 is opened, and the milking solution 16 is caused to flow through ion exchange bed 15 by withdrawing the plunger of hypodermic syringe 19. Solution 16 elutes the daughter radioisotope barium 137 which is less tightly occluded to the ion exchange resin than is the parent radioisotope cesium 137.

Valve 17 is then closed and hypodermic piston 18 extracts flushing solution 51 from the holder 50 through valve 52. Hypodermic piston 18 then injects part of the flushing solution into milker solution 16 through valve 53. Hypoderic syringe 19 then injects the "milk" or solution of barium 137, and part of the flushing solution 51, via capillary tube 13 into conduit 10. The injection is made as rapidly as possible so as to approximate a single slug. Hypoderic syringe 18 then injects the rest of flushing solution 51 through valve 53 and capillary tube 13 into conduit 10.

In lieu of barium 137, other radioisotopes may be employed. The choice depends largely upon the availability of radioisotope material in a form which is compatible with the fluid stream in conduit 10. Thus, the flow rate of gases may be determined with, for example, argon-41, with a half-life of 1.82 hours, and aqueous streams may be determined with, for example, sodium-24 having a half-life of about 15 hours, etc. It generally is advisable to use a short half-lived material having a half-life less than about 48 hours, and preferably less than about 4 hours, although materials of longer half-life may be employed where the danger of radioactive contamination is insignificant. Radioisotopes which are presently available on a commercial scale are listed in the current book "Radioisotopes—Special Materials and Services," published by the Oak Ridge National Laboratory, Oak Ridge, Tennessee.

Depending upon the nature of the radioactive isotope, various other devices for introducing the radioisotope into conduit 10 may be employed. Mention may be made, in this respect, to injections with high pressure inert gas, bursting of rupture disks separating a radioisotope enclosure from conduit 10 by applying pressure on said enclosure, and other known means for rapidly introducing a small amount of radiotracer into a stream of relatively large volume.

As the radioisotope is carried along conduit 10 with the fluid stream, the radioactivity it emits is detected by detectors 1a, etc. These detectors are sensitive to the form of radiation emitted (usually gamma) and signal a pulse for each particle or photon detected. The pulses are transmitted through the appropriate electronic amplifier 4a, etc., and are employed to form a discrete spot or mark on permanent record 8. Preferably, one mark is formed for each pulse of radiation detected, although suitable electronic frequency dividers such as the bi-stable Eccles Jordan or "flip-flop" circuits may be employed to provide one mark for several radiation pulses.

Permanent record 8, which is advanced at a known constant rate by means of strip chart device 7, may be any type of permanent or semipermanent record paper which is capable of being marked rapidly. The preferred type of paper is the so-called electric marking paper, which is grey but forms a black spot each time an electric current or spark of at least about 200 v. and 50 Ma. is caused to flow through a portion of the paper. A more elegent type of record may be obtained with suitable recorders employing magnetic tape or sensitive photographic film, etc.; these may be read by mechanical or electrical means.

In the preferred and simplest embodiment of the invention, the signals from respective radiation detectors 1a, etc., are amplified by means of a high-speed multichannel amplifier 6, composed of individual three-stage amplifiers 4a, etc. Each of these amplifiers is an electronic amplifier and may comprise a conventional arrangement of triode vacuum tubes or transistor solid-state amplifiers. Each amplifier 4a, etc., delivers its output through electrodes 5a which connect to ground via record paper 8, as shown in FIGURE 1.

After making a radiotracer test, record 8 should resemble the strip shown schematically in FIGURE 2. For ease and certainty of identification, each of the radiation detectors 1a, etc., establishes an individual trace along adjacent paths, although in a less-preferred embodiment all detectors may deliver and record along a single path. The preferred form is shown in FIGURE 2, and it is seen that a group of pulses is recorded by the passage of radioisotope material near each of radiation detectors 1a, etc. Thus burst 20 corresponds to the passage of radioisotope past detector 1a, burst 21 corresponds to the passage near detector 1b, etc. The spread of consecutively-received bursts affords an indication of the degree of turbulence or diffusion exhibited by the tracer. Background radiation caused by cosmic rays, etc., appears as isolated marks 24 which may be readily distinguished visually from the larger bursts 20, 21 22 and 23 corresponsind to those produced by the injected radioisotope, and suitable corrections can be made.

Turning now to FIGURE 3, a record is shown of a fluid in viscous flow. The slug of radioisotope as it passes detector 1a produces a compact burst 25, but the burst becomes progressively longer and the mark density per unit length decreases due to laminar flow conditions as the radioisotope passes successive detectors 1b (burst 26), 1c (burst 27), and 1d (burst 28).

FIGURE 4 illustrates the type of record obtained when a separation of the radioisotope occurs by reason of a large obstruction in conduit 10 or because of very slow viscous flow conditions. As shown in the figure, a pair of bursts 31—32, and 33—34, is formed in contrast to the single burst of FIGURE 2.

To obtain the linear flowrate of fluid flowing through conduit 10, it is necessary only to read the distance between adjacent marks on record 8, divide this into the linear record 8 travel rate in consistent units, and multiply the resultant answer (in units of reciprocal time) by the distance between corresponding radiation detectors. Thus, if detectors 1a and 1b are six feet apart, record 8 travels at a rate of ten inches per second, and marks 20 and 21 on FIGURE 2 are five inches apart, the linear flowrate in conduit 10 is twelve feet per second. The volumetric flowrate may be obtained by multiplying the linear flowrate by the cross-sectional area of conduit 10, applying, if desired, an appropriate correction factor to account for the difference between maximum and average flowrate.

Ordinarily, bursts 20 and 21 are in the form of a dense line of dots of definite length, and it frequently becomes desirable to determine a reproducible position on the burst in order to obtain optimum accuracy of the time measurements. Various reproducing locations may be employed, such as the location of maximum impulse density, the mid-point of a burst, the leading edge of a burst (which may be employed in calculation of viscous flow conditions), etc. It has been found that an extremely reproducible characteristic location is the inflection point of a plot showing the integral number of pulses received as a function of distance along record 8. Another excellent characteristic location is the 50% point on a probability chart showing the number of pulses received on the probability scale as a function of the distance on record 8.

An especially important advantage of the present invention is that it may be employed with small amounts of radioactive material, e.g., less than 10 millicuries, and even as low at 0.1 millicuries, although larger amounts may be employed without departing from the spirit and scope of this invention. The larger amounts are useful for measuring velocities in the hundreds of feet per second range. Moreover, it is unnecessary to obtain accurate knowledge—or, for that matter, any knowledge whatever—of the radiation intensity level inasmuch as the number of radiation counts received is immaterial with respect to flow calculations according to this inventive method. For the same reason, it is not essential to employ uniform rate of introduction of the radioisotope tracer, in contrast to prior art rariotracer techniques, since identical points can be located on each burst shown on the record.

Moreover, the inventive system avoids a major statistical error inherent in all radiation counting techniques. It is well known that radioactive decay follows classical statistical laws, and whenever disintegrations are counted, there is a 50–50 chance that the count varies by more than 0.67 times the square root of the statistical average. Thus in a prior-art technique wherein the detector records, say, 100 counts, there is a 50–50 chance that the true count is less than 93 or more than 107, ($100 \pm 0.67\sqrt{100}$). Since in the present system no counting is involved, this statistic error is obviated entirely.

The inventive system has found outstandingly important usage in the measurement of vaporization taking place in furnace tubes. In studying the operation of furnaces, it is essential to determine the percentage of the furnace feed vaporizing in each tube or section of the furnace. Hitherto this has only been accomplished by indirect estimates based on temperature measurements and computed heat transfer coefficients. Now with the present system direct measurements are possible.

To perform measurements of percent vaporization, it is first necessary to know or estimate the volume of vapor derived from the vaporization of a unit volume of liquid. Then, preferably using the inventive system, velocity measurements are made of the "cold" or unboiled liquid in a pipe or a furnace tube wherein no vaporization is taking place. Following this, velocity measurements are made through a furnace tube or section in which the vaporization is occurring. The increase in linear velocity caused by liquid being converted to vapor of larger volume per unit weight is then a measure of the amount of vaporization which has occurred in the tube or section under test. For example, if one barrel of oil as liquid can form A barrels of oil vapor, then the percentage of vaporizaiton P may be computed according to the formula:

(Velocity of "cold" liquid)

$$= \text{(Velocity of liquid plus vapor)} \left(\frac{AP}{100} + 1 - \frac{P}{100}\right)$$

The assumption involved, that the velocity of "hot" liquid is equal to the velocity of the vapor, has been verified to be accurate by measuring velocities through the same tube with gaseous radioisotopes and non-volatile radioisotopes.

Thus it is apparent that we have accomplished the objects of our invention. By introducing a small amount of a radioisotope into a fluid stream and recording the radioactivity emitted by said radioisotope using a plurality of detectors and a permanent record consisting of distinguishable bursts composed of discrete markings, the flow characteristics such as amount of vaporization, exert of diffusion, and linear velocity may be readily determined. While a specific embodiment showing parallel laterally-spaced bursts has been depicted herein, it is manifest that other embodiments or improvements may be employed without departing from the spirit and scope of the invention defined in the subsequent claims.

We claim:

1. In an apparatus for determining the flow characteristics of a fluid stream flowing in a conduit including means for introducing a small amount of a radioisotope into said fluid stream, and a plurality of radiation detector means spaced at known distances along said conduit, the improvement comprising recorder means responsive to said radiation detector means for recording radioactivity detected by respective detectors as distinguishable bursts composed of discrete dots corresponding to individual pulses of radiation on a permanent record as an indication of said flow characteristics.

2. Apparatus of claim 1 wherein said radiation detector means include scintillation counter means, whereby the measurement of high velocities using minute amounts of radioisotope is accomplished.

3. Apparatus of claim 1 wherein said recorder means includes an electronic amplifier and is adapted to record individual pulses of radioactivity on electric marking paper.

4. Apparatus of claim 1 wherein at least three radiation detector means are employed.

5. Apparatus for determining the amount of vaporization occurring in a furnace tube which comprises: means for introducing a small amount of a radioisotope into the furnace tube, at least three radiation detector means spaced at known distances along said tube, and recorder means responsive to said radiation detector means for recording radioactivity detected by respective detectors as distinguishable bursts composed of discrete dots corresponding to individual pulses of radiation on a permanent record, the increase in velocity of the radioisotope between successive detectors being a measure of the amount of vaporization occurring in said furnace tube.

6. Apparatus for determining the flow characteristics of a fluid stream flowing in a conduit which comprises: means including a cesium–137 milker which provides a small amount of barium–137 for introduction into said fluid stream, a plurality of radiation detector means spaced at known distances along said conduit, and recorder means responsive to said radiation detector means for recording radioactivity detected by responsive detectors as distinguishable bursts composed of discrete dots corresponding to individual pulses of radiation on a permanent record as an indication of said flow characteristics.

References Cited in the file of this patent

UNITED STATES PATENTS 2,631,242     Metcalf _____ Mar. 10, 1953

(Other references on following page)

UNITED STATES PATENTS

| | | |
|---|---|---|
| 2,640,936 | Pajes | June 2, 1953 |
| 2,826,700 | Hull | Mar. 11, 1958 |
| 2,841,713 | Howard | July 1, 1958 |

OTHER REFERENCES

Using Gas Tracers in Refinery Control, Hull, Nucleonics, vol. 13, No. 4, April 1955, pages 18 to 21.

International Conference on Peaceful Uses of Atomic Energy, 1955, vol. 15, pages 148, 149, 170 and 194 to 198.

Scintillation Counting, 1956, Nucleonics, vol. 14, No. 4, pages 33 to 64.